United States Patent
Lin et al.

(10) Patent No.: US 7,978,776 B2
(45) Date of Patent: Jul. 12, 2011

(54) CHANNEL ESTIMATION DEVICE AND RELATED METHOD OF AN ORTHOGONAL FREQUENCY DIVISION MULTIPLEXING SYSTEM

(75) Inventors: Jui-Yuan Lin, Yung-Kang (TW); Jui-Chi Chen, Yung-Kang (TW)

(73) Assignee: Southern Taiwan University of Technology, Tainan County (TW)

( * ) Notice: Subject to any disclaimer, the term of this patent is extended or adjusted under 35 U.S.C. 154(b) by 746 days.

(21) Appl. No.: 12/007,821

(22) Filed: Jan. 16, 2008

(65) Prior Publication Data

US 2009/0180557 A1 Jul. 16, 2009

(51) Int. Cl.
*H04L 27/28* (2006.01)

(52) U.S. Cl. ................................ 375/260; 370/210

(58) Field of Classification Search .......... 375/260; 370/208–210, 342, 350

See application file for complete search history.

(56) References Cited

U.S. PATENT DOCUMENTS

| | | | |
|---|---|---|---|
| 2006/0092902 A1* | 5/2006 | Schmidt | 370/342 |
| 2007/0165727 A1* | 7/2007 | Fanson | 375/260 |
| 2008/0101490 A1* | 5/2008 | Kawauchi et al. | 375/260 |
| 2008/0198835 A1* | 8/2008 | Miyanaga et al. | 370/350 |
| 2010/0226449 A1* | 9/2010 | Ilow et al. | 375/260 |

* cited by examiner

*Primary Examiner* — Emmanuel Bayard
(74) *Attorney, Agent, or Firm* — Rosenberg, Klein & Lee (57) ABSTRACT

A channel estimation device for orthogonal frequency division multiplexing system and related method. The transmitting end transmits error detection signal of subcarrier, and the channel estimation is decided by whether the received signal at the receiving end is correct. Furthermore, in order to reduce the calculation complexity of the channel estimation, least square estimation is performed first, then MMSE estimation is performed to obtain more precise channel estimation, and singular value decomposition is utilized to reduce the calculation complexity of MMSE. The above-mentioned channel estimation method can obtain a better system efficiency in fast time variant channel.

15 Claims, 9 Drawing Sheets

CHANNEL ESTIMATION DEVICE AND RELATED METHOD OF AN ORTHOGONAL FREQUENCY DIVISION MULTIPLEXING SYSTEM

BACKGROUND OF THE INVENTION

1. Field of the Invention

The present invention is related to a channel estimation device and related method of an orthogonal frequency division multiplexing system, and more particularly, to a channel estimation device and related method for tracking fast changing channel to improve the system efficiency.

2. Description of the Related Art

Currently, orthogonal frequency division multiplexing (OFDM) system is very common in wireless communication. Wireless channels usually are frequency selective and time varying, even the OFDM system has very good anti-frequency selective fading ability, it is still necessary to have a good channel estimation system at the receiving end to improve system efficiency. Especially when the system is in fast time varying wireless channel, the receiving end needs better dynamic channel estimation means to assistant the demodulation process for more correct OFDM signal to obtain better system efficiency.

Moreover, in prior art technology, in order to understand the unknown channel, pilot signals or training signals are usually added in the transmitted signals. The pilot signal is known signal information for the receiving end, therefore, at the receiving end the channel estimation can be performed with the pilot signal to obtain the information of the channel characteristics. When the pilot signal is added, in order to increase the transmission bandwidth, the pilot signal can only be used between few specific subcarriers in the OFDM, and the channel estimation can only perform channel characteristics estimation to these subcarriers. Afterward, these estimated subcarrier information is used to perform channel characteristics estimation to other subcarrier with non-pilot signal, and the method is usually is interpolation.

However, in the prior art technology, many channel estimation methods of the OFDM systems are developed under slow fading channel, and these systems are usually assumed as having small channel change during the time of several OFDM symbol time. Therefore, after the first channel estimation (usually using the training symbol to perform the channel estimation) before the next training symbol, the previous estimated channel characteristic can be used for data detection. Actually, in broadband wireless channel, the channel might have obvious change in one symbol of the OFDM. In the other words, different channel characteristics occur to two continuous symbols; by using the previous estimated channel to perform the data detection to the next symbol might cause huge error, which makes low efficiency of the system.

Therefore, it is desirable to provide a channel estimation device and related method of an orthogonal frequency division multiplexing system, to mitigate and/or obviate the aforementioned problems.

SUMMARY OF THE INVENTION

A main objective of the present invention is to provide channel estimation device and related method of an orthogonal frequency division multiplexing system to improve receiving efficiency and lower the detection error.

In order to achieve the above mentioned objective, the channel estimation for the orthogonal frequency division multiplexing system of the present invention, characterized in that:

error detection is performed on the received signal obtained from the fast Fourier transform process to detect whether the received subcarrier has any errors, and the channel estimator obtains a frequency response of the channel by controlling the error detection.

DETAILED DESCRIPTION OF THE PREFERRED EMBODIMENT

Other objects, advantages, and novel features of the invention will become more apparent from the following detailed description when taken in conjunction with the accompanying drawings.

Figure 1:
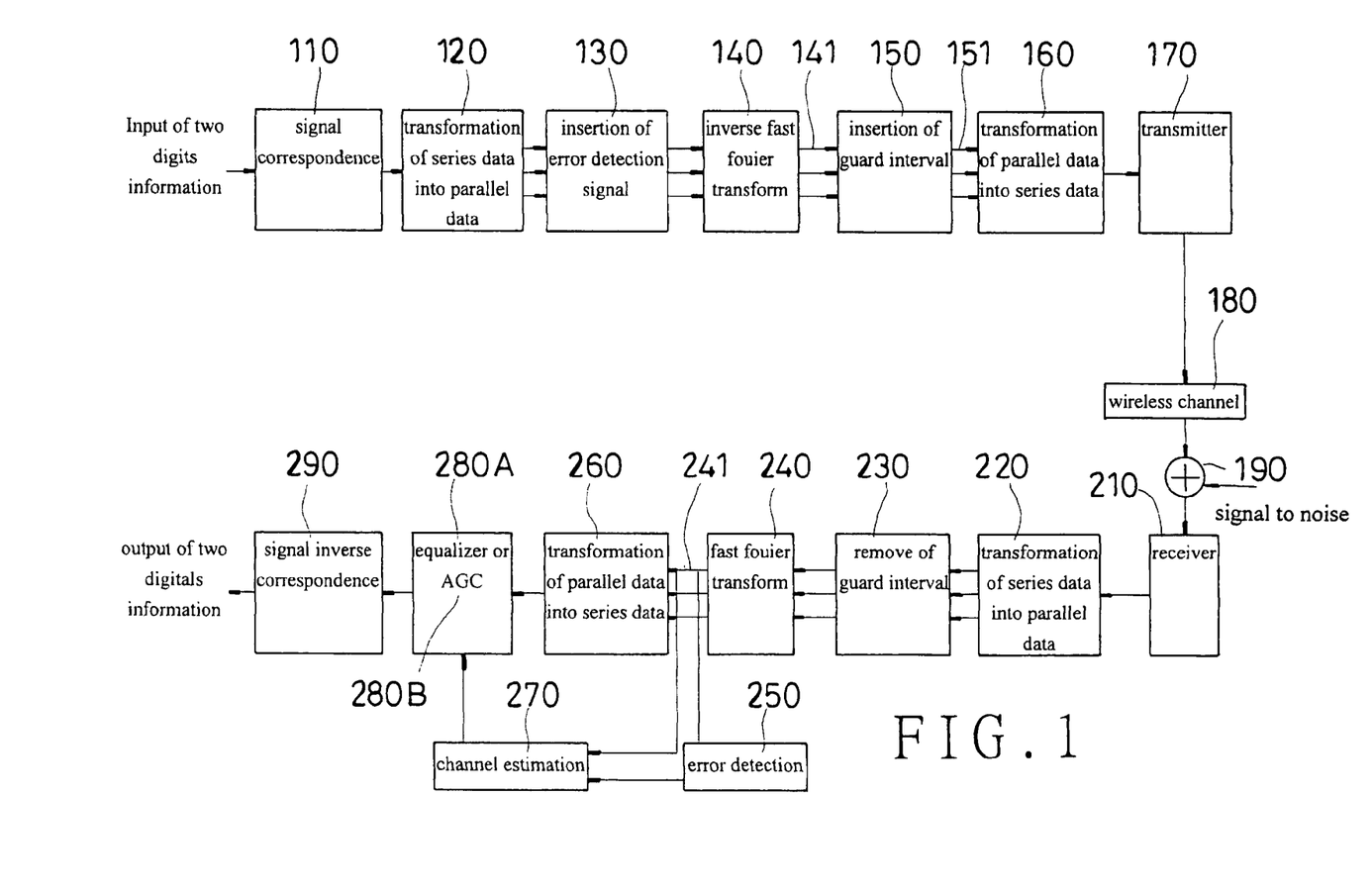
FIG. 1 is a functional block drawing of an OFDM system of the present invention.

First, please refer to FIG. 1. FIG. 1 is a functional block drawing of a system of the present invention. A OFDM system uses a transmitting end to modulate two digits information data, which is also called signal correspondence (110); transforms series data into parallel data (120); inserts an error detection signal (130) to obtain a modulation subcarrier signal X(k) on frequency domain, and this error signal can be used for detecting the error in the received signal; performs inverse fast Fourier transform (IFFT) (140) on the modulation signal X(k); and transforms the signal X(k) on frequency domain into a time domain signal (141) x(n):

$$x(n) = IDFT\{X(k)\} = \sum_{k=0}^{N-1} X(k)e^{j2\pi kn/N}, \quad \text{(a)}$$

$$n = 0, 1, \ldots, N-1$$

wherein N is the number of the subcarrier in the OFDM system.

In order to prevent inter-symbol interference, a guard interval is usually inserted between the symbols of the two time domain signals (150) to become a transmission signal $x_g(n)$ (151) of the OFDM system:

$$x_g(n) = \begin{cases} x(N+n), & n = -N_g, -N_g+1, \ldots, -1 \\ x(n), & n = 0, 1, \ldots, N-1 \end{cases} \quad (b)$$

wherein $N_g$ is the length of the inserted guard interval (150).

The time domain signal with inserted guard interval (150) is transformed from parallel data into series data (160), and transmitted by a transmitter (170) via a wireless channel (180) to a receiver (210). The received signal of receiver can be presented as:

$$y_g(n) = x_g(n) \otimes h(n) + w(n) \quad (c)$$

wherein h(n) is an impulse response of the channel, and w(n) is an additive white gaussian noise (AWGN) (190), and ⊗is a convolution symbol of the two signals.

A demodulation process performed at a receiving end is, transforming series data into parallel data (220), removing the guard interval (230), and using a fast Fourier transform (240) (FET) to transforming from the time domain to the frequency domain to become a received signal (241) Y(k) on the frequency domain:

$$Y(k) = DFT\{y(n)\} = \frac{1}{N}\sum_{n=0}^{N-1} y(n)e^{-j2\pi kn/N} \quad (d)$$
$$k = 0, 1, \ldots, N-1$$

An error detection (250) is performed to the received signal Y(k) to detect whether the received signal has any error. If the length of the guard interval is larger than the length of the channel impulse response, the nearby symbols in the OFDM will not have ISI problem, therefore, the demodulated symbol Y(k) is:

$$Y(k) = X(k)H(k) + I(k) + W(k), k = 0, 1, \ldots, N-1 \quad (e)$$

wherein H(k) is the frequency response of the channel, I(k) is ICI formed by the Doppler effect of the transmitter and the receiver, W(k) is a Fourier transform of w(n).

In the equation (e), the estimated frequency response H(k) of the channel is obtained by the channel estimation (270), and the original transmitted signal X(k) is obtained by an equalizer (280A) or an automatic gain control (AGC) circuit (280B); therefore, the final received signal X(k) is $$X_E(k) = \frac{Y(k)}{H_E(k)}, k = 0, 1, \ldots, N-1 \quad (f)$$

wherein $H_E(k)$ is an estimated channel frequency response. The received signal X(k) is returned back to original two digits information output via a signal inverse correspondence (290).

Figure 2:
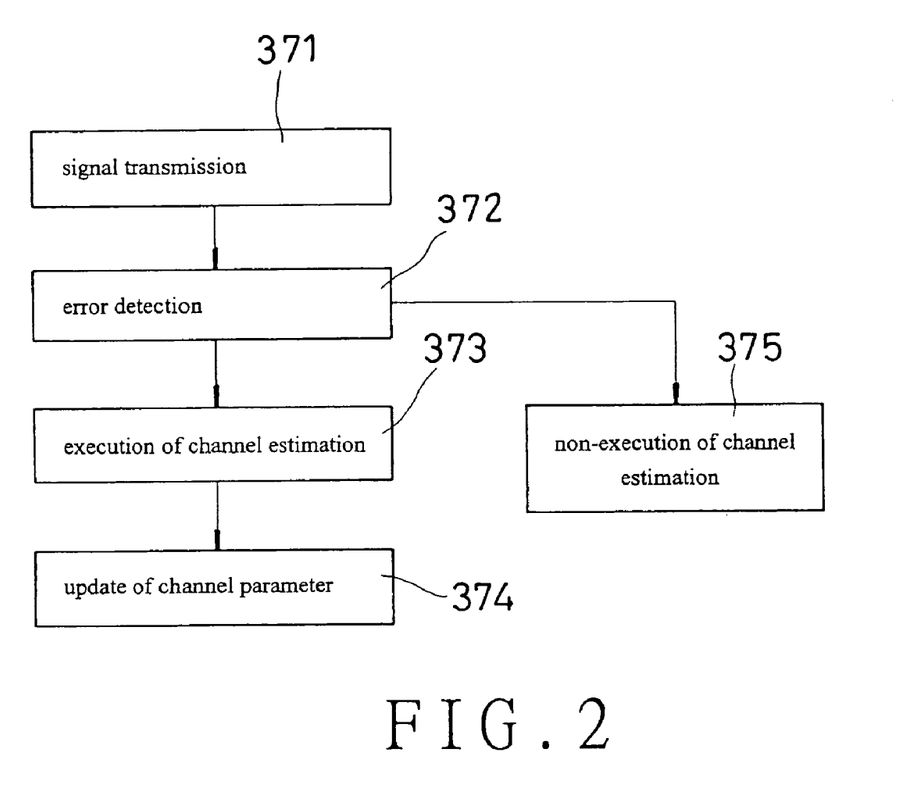
FIG. 2 is a flowchart of a channel estimation performed by the system of the present invention.

Please refer to FIG. 2. FIG. 2 is a flowchart of a channel estimation performed by the system of the present invention, which is:

(a) transmitting a signal (371): the first symbol transmitted by the transmitter is a know signal, the receiver (210) receives this know symbol and use it to perform the channel estimation (270) and store channel parameters (b) error detection (372): while receiving the data symbol, the receiver (210) can use the inserted error detection signal (130) transmitted by the transmitter (170) to perform the error detection (250) of the data symbol to detect whether the symbol has any error;

(c) executing the channel estimation (373) or not executing the channel estimation (375): if the above-mentioned symbol is a reliable symbol, this reliable symbol is used to performed the channel estimation;

(d) updating the channel parameter (374): by performing the channel estimation (270) to update the channel parameter.

One embodiment of the channel estimation is, when the receiver (210) processes the received signal (241) via the fast Fourier transform (240), the channel estimation (270) is performed to obtain the channel response to recover back to the original signal. Before transmitting the signal, a set of OFDM symbols which are all pilot signals to estimate unknown channel response, in order to reduce the error of the estimation, a MMSE estimation, is performed first, the beginning of OFDM transmission signal is a set of all pilot signals as:

$$X_P(n) = \text{pilot signal } n = 0, 1, 2, \ldots, N-1 \quad (g)$$

The estimation method uses the least square estimation to obtain the channel frequency response;

$$\hat{H}_{P,LS} = [H_{P,LS}(0) \ H_{P,LS}(1) \ \cdots \ H_{P,LS}(N-1)]^T \quad (h)$$
$$= X_P^{-1} Y$$
$$= \left[ \frac{Y(0)}{X_P(0)} \ \frac{Y(1)}{X_P(1)} \ \cdots \ \frac{Y(N-1)}{X_P(N-1)} \right]^T$$

wherein Y(k) is the received signal, and the estimated channel response by the least square estimation is $\hat{H}_{P,LS}(k)$. Since the least square estimation is easy to be interfered by noise (190), after the least square estimation the MMSE estimation is performed for more precise channel estimation (270):

$$\hat{H}_{P,mmse} = R_{HH_{P,LS}} R_{H_{P,LS}H_{P,LS}}^{-1} \hat{H}_{P,LS} \quad (i)$$
$$= R_{HH}\left(R_{HH} + \sigma_n^2 (X_P X_P^H)^{-1}\right)^{-1} \hat{H}_{P,LS}$$

wherein $\sigma_n^2$ is a variance of noise (190)$^{W(k)}$, and its Covariance Matrix is $$R_{HH} = E\{HH^H\}$$
$$R_{HH_{P,LS}} = E\{H\hat{H}_{P,LS}^H\}$$
$$R_{H_{P,LS}H_{P,LS}} = E\{\hat{H}_{P,LS}\hat{H}_{P,LS}^H\} \quad (j)$$

According to equation (i), as long as the pilot signal or training symbol $X_P$ is changed, an inverse matrix operation needs to be performed, the complication of the MMSE estimation is also increased. A mean value of symbol can be used to reduce the complication of the MMSE estimation, $(X_P X_P^H)^{-1}$ in equation (i) is replaced by an exception value $E(X_P X_P^H)^{-1}$, and each signal point shown on a signal constellation drawing has the same probability. Therefore, the obtained $E(X_P X_P^H)^{-1} = E|1/x_P(k)|^2 I$, wherein I is a unit matrix, the definition of a SNR (signal-to-noise ratio) is $E|x_P(k)|^2/\sigma_n^2$, and the equation (i) can be simplified as:

$$\hat{H}_P = R_{HH}\left(R_{HH} + \frac{\beta}{SNR}I\right)^{-1} \hat{H}_{P,LS} \quad (k)$$

wherein $\beta = E|x_P(k)|^2 E|1/x_P(k)|^2$ is a constant, and is decided by the signal constellation drawing, for a 16-QAM system the β value is β=17/9. If the $R_{HH}$ and SNR are known in the beginning, it only needs to calculate $$R_{HH}\left(R_{HH} + \frac{\beta}{SNR}I\right)^{-1}$$

for once. Even through the equation (i) (+−) can help to avoid repeating the inverse matrix operation, the complication of the estimator is still high. Since the channel correlation matrix $R_{HH}$ need as N times complex multiplication. In order to reduce the operation number of multiplication, a singular matrix Decomposition [SVD] algorithm can be used to decompose the channel correlation matrix into:

$$R_{HH} = U\Lambda U^H \quad (1)$$

wherein U is a column orthogonal matrix, its column vectors are $u_0, u_1, \ldots, u_{N-1}$, $\Lambda$ is a diagonal matrix and its dia-gonalfactor is $\lambda(0) \geq \lambda(1) \geq \ldots \geq \lambda(N-1) \geq 0$. Therefore, an equation with lower complication is:

$$\hat{H}_P = U \begin{bmatrix} \Delta_P & 0 \\ 0 & 0 \end{bmatrix} U^H \hat{H}_{P,LS} \quad (m)$$

wherein $\Delta_P$ is a diagonal matrix, and its content is:

$$\delta(k) = \frac{\lambda(k)}{\lambda(k) + \frac{\beta}{SNR}}, k = 0, 1, \ldots, N-1 \quad (n)$$

Figure 3:
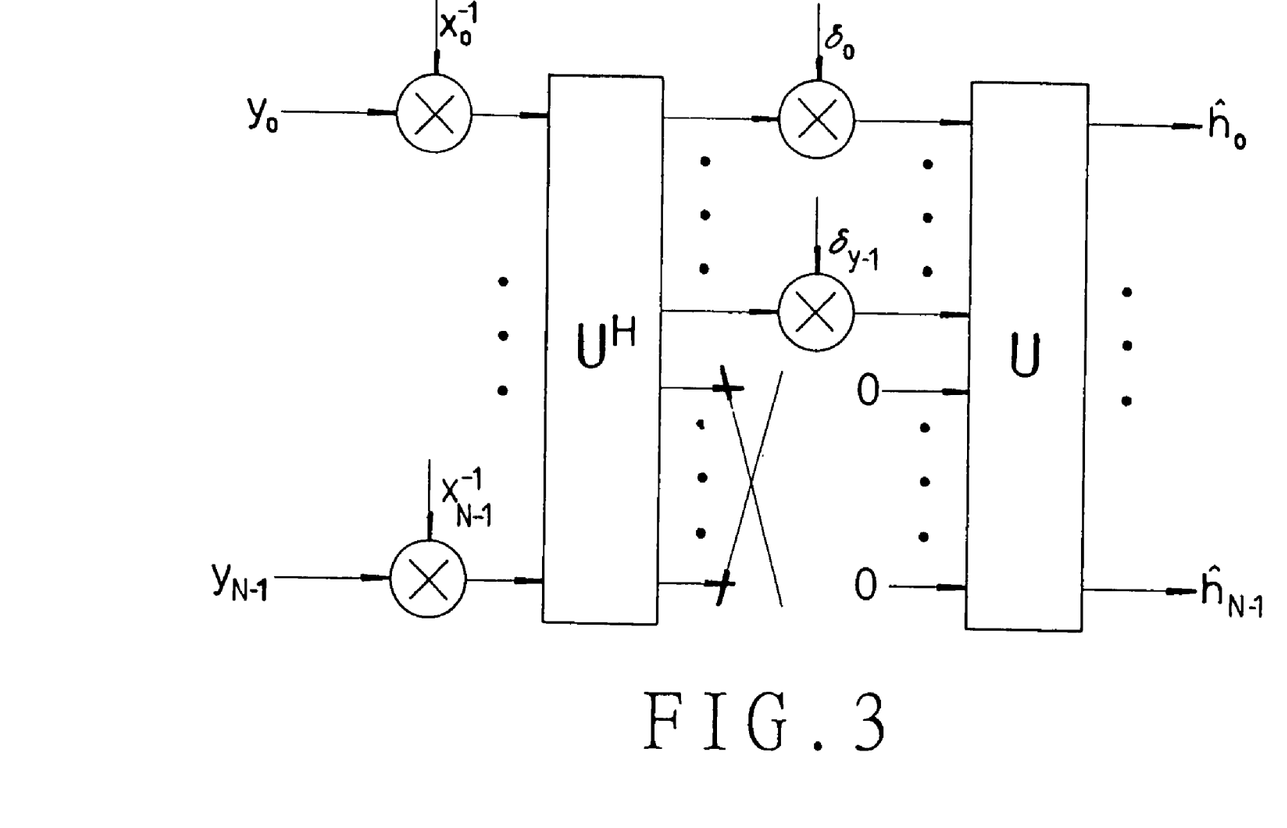
FIG. 3 is a functional block drawing of a MMSE channel estimation according to the present invention.

A flowchart of a channel estimation is shown in FIG. 3.

Figure 4:
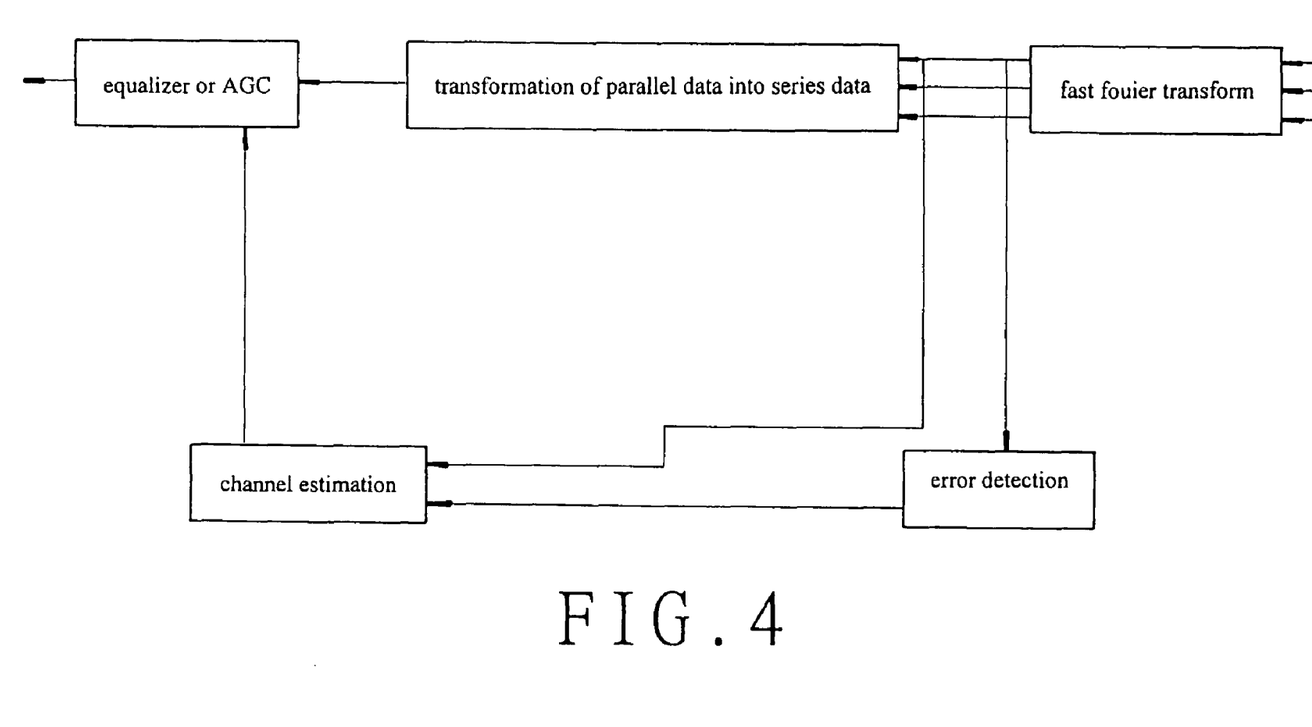
FIG. 4 is a functional block drawing of a reliable symbol channel estimation according to the present invention.
Figure 5:
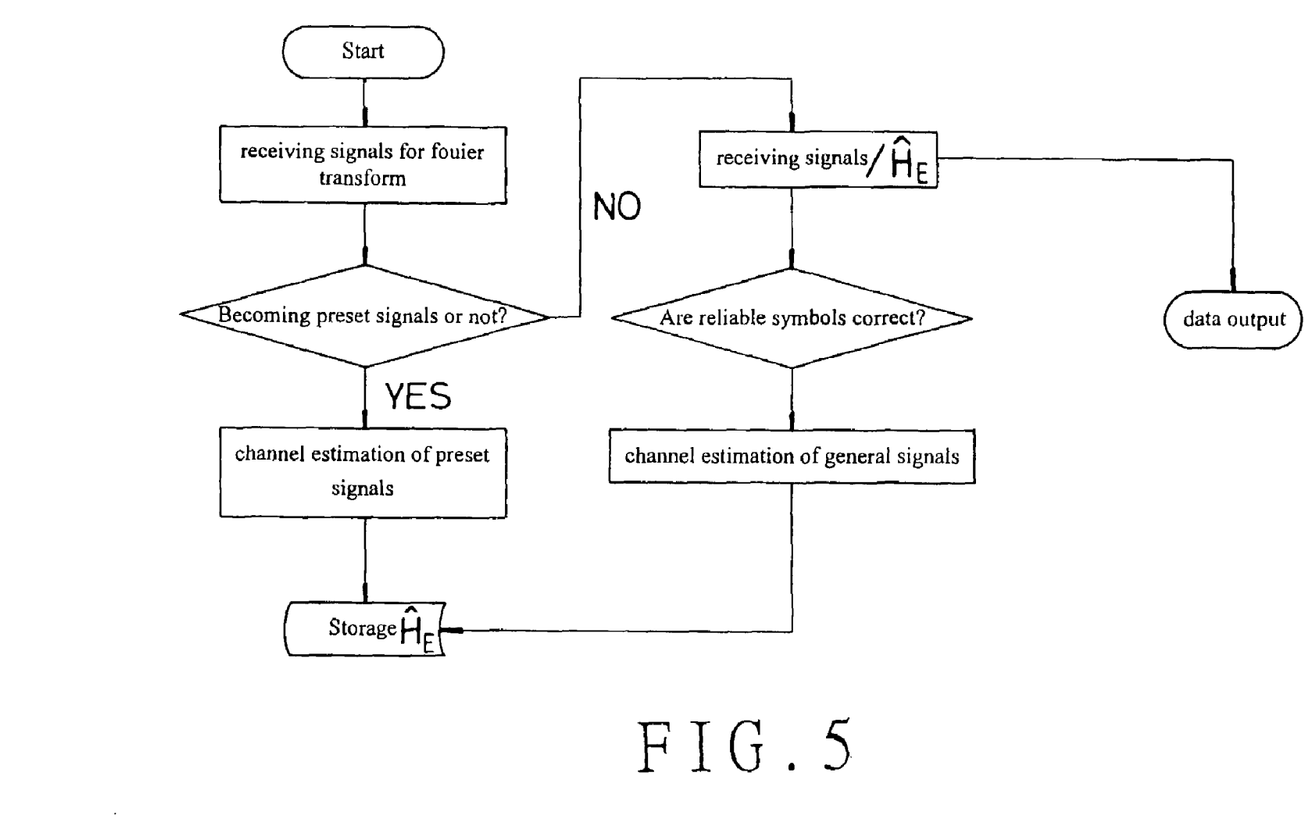
FIG. 5 is a flow chart of the reliable symbol estimation according to the present invention.

Please refer to FIG. 4. FIG. 4 is a functional block drawing of a reliable symbol channel estimation according to the present invention. In order to increase the reliability of the data of the channel estimation (270), a check sum value of the entire symbols in the few subcarrier at the transmitting end, because the number of the subcarrier is less than the number of the transmitting pilot signal, which can obtain a larger data bandwidth. Therefore, at the receiving end, the first channel estimation (270) is performed to the pilot symbol, the arriving data performs demodulation detection on this estimation channel, and the check sum information is added to the symbol at the transmitting end. The check sum information can be used to determine whether the demodulation data is correct; if the data is correct, it indicates the symbol is a reliable symbol. Therefore, at the receiving end this symbol can be used to perform the general channel estimation (270). The MMSE channel estimation is used to obtain the current channel parameter, if the symbol is incorrect, the receiving end does not execute the channel estimation (270) and keep the previous estimated channel parameter for next receiving symbol until receiving correct symbol for new channel estimation. Afterward, not every OFDM symbol needs the channel estimation (270) but still tracks changes of the time variant channel, and the system efficiency is also improved. (Please refer to FIG. 5).

Following description is a simulated demonstration of the channel estimation of the orthogonal frequency division multiplexing system. First, a simulation parameter of the OFDM is set, the modulation of the OFDM system uses a 16-QAM (quadrature amplitude modulation), and its carrier has a 2.4 GHz center frequency, 20 MHz bandwidth, and the total number of the subcarrier is N=64; wherein 61 subcarriers are used for transmitting regular data, and the other 3 subcarriers are used for transmitting check sum signal. A wireless channel model is a time variant multiple channel model of the Jakes' model. Assuming the guard interval is larger than the maximum path delay of the channel, which means this system has no ISI problem. Furthermore, for time variant channel at different speeds, different channel estimations are used to estimate and compare the channels. At the transmitting end, a pilot signal is evenly inserted in one OFDM symbol; at the receiving end, the channel frequency responses is estimated for the pilot signal and a complete channel is calculated by an interpolation algorithm. The number of the interpolated pilot signal is ¼ time than the original signal, which shows the interpolation method and the check sum method are totally different from each other. Therefore, a MATLAB (Matrix Laboratory) is used for simulating the efficiency difference of two methods; during the simulation, the estimated value and the actual value of the MSE of the channel response are compared, and the MSE is defined as:

$$MSE = \frac{1}{N}\sum_{k=0}^{N-1}\left|H(k) - \hat{H}(k)\right|^2 \quad (o)$$

Figure 6:
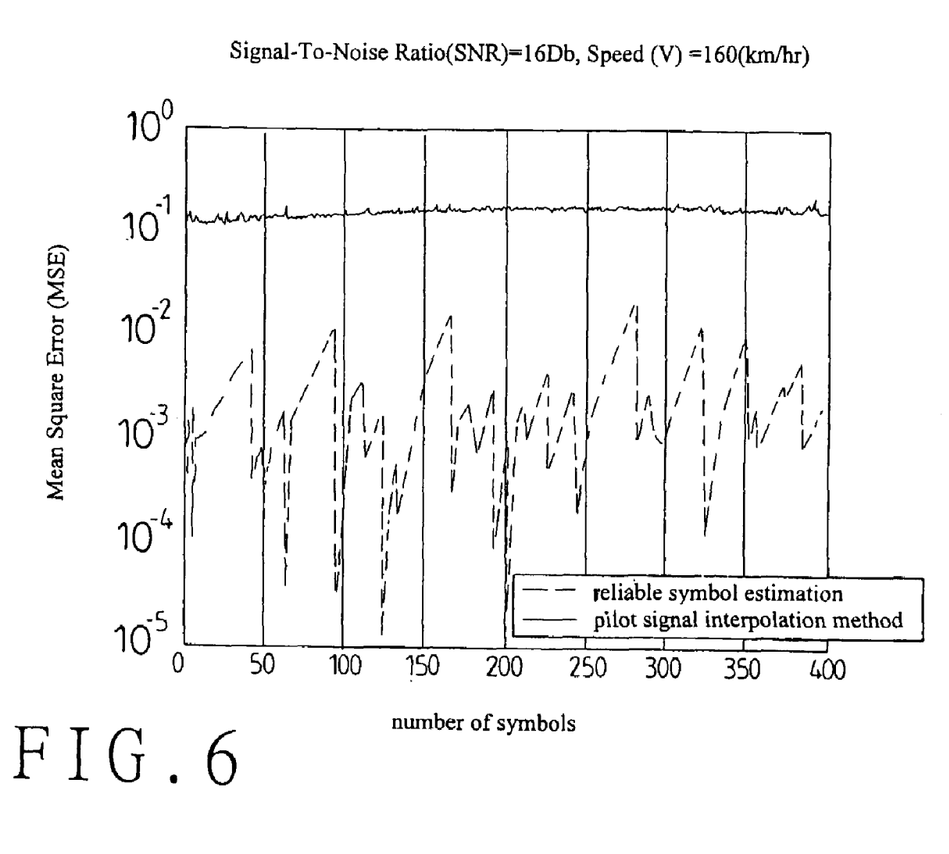
FIG. 6 is a comparison drawing of the MSE of the channel estimation according to the present invention.
Figure 7:
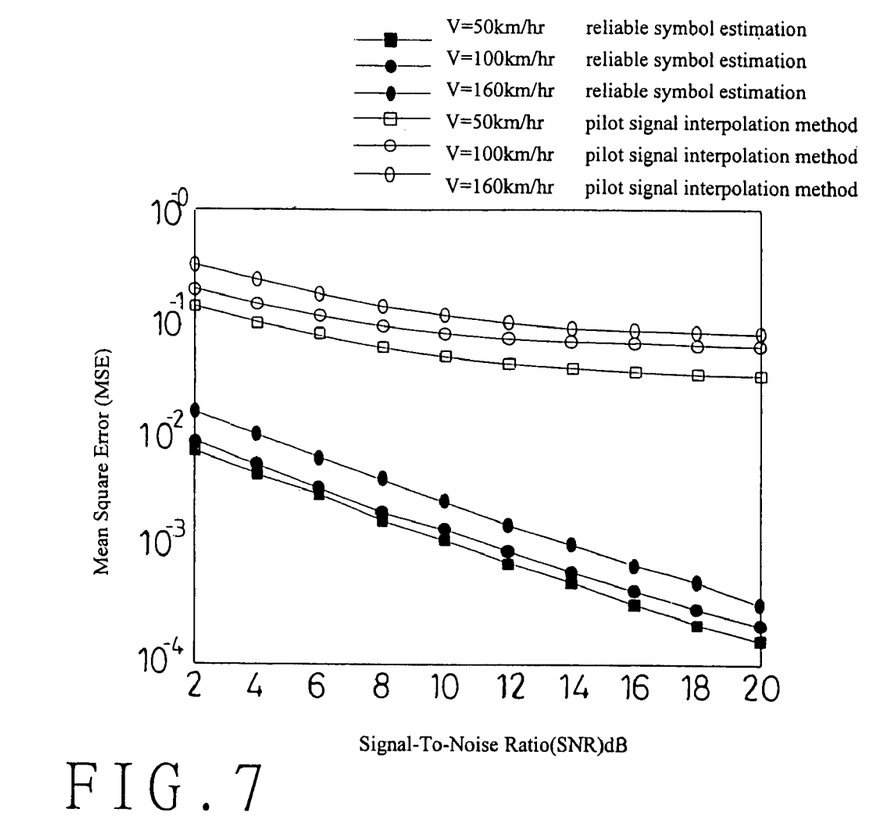
FIG. 7 is a comparison drawing of MSE to SNR ratio of an estimated channel and an actual channel according to the present invention.
Figure 8:
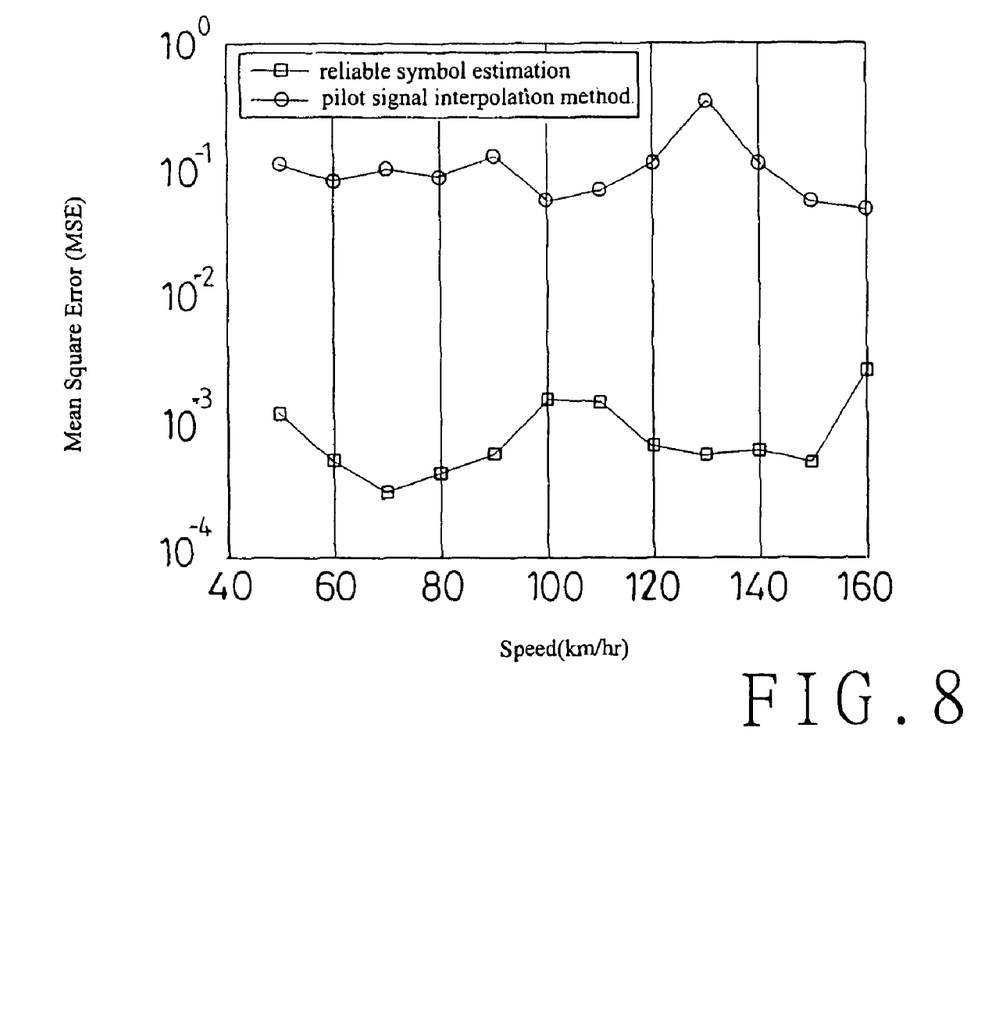
FIG. 8 is a comparison drawing of the different MSE values at different speed according to the present invention.

Please refer to FIG. 6. FIG. 6 shows MSE comparison of transmitting 400 OFDM symbols (usually one transmission package had 200~400 symbols) channel estimation. As shown in the drawing, the MSE using the reliable symbol estimation can track the time variant channel when the channel is changing. Please refer to FIG. 7. FIG. 7 shows the comparison of MSE to SNR ratio between the estimated channel and the actual channel at different speed (V=50 km/hr, V=100 km/hr and V=160 km/hr). As shown in the drawing, the MSE of the reliable symbol channel estimation is lower than the one from interpolation method, therefore, the method of the present invention is better than the interpolation method. Please refer to FIG. 8. As shown in the drawing, at different speeds, MSE of the estimation method of the reliable symbol is lower than the interpolation methods, which means the reliable symbol estimation can do better channel estimation than the interpolation method.

Figure 9:
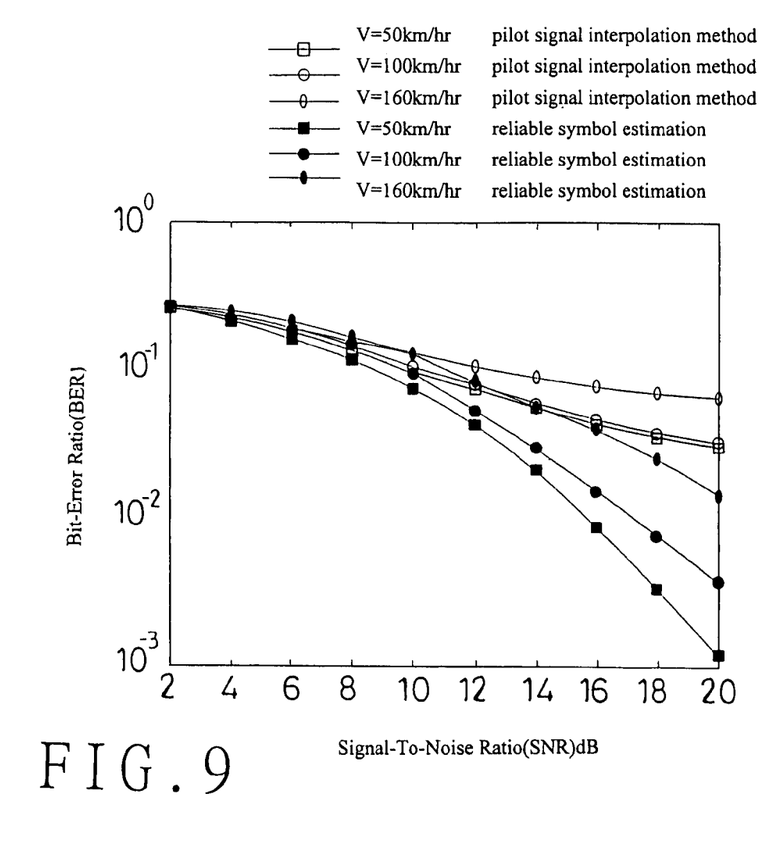
FIG. 9 is an efficiency comparison drawing of BER to SNR efficiency at moving speeds according to the present invention.

Please refer to FIG. 9. FIG. 9 is a efficiency comparison drawing of BER to SNR at moving speeds V=50, 100, 160 km/hr. As shown in the drawing, the reliable symbol channel estimation has a better efficiency than the interpolation method. At speed V=50 km/hr and V=100 km/hr, due to slower channel change, the reliable symbol channel estimation can easily track the change of the time variant channel. The obtained BER value is very close to the actual BER result of the known channel response, and in a fast channel change environment (speed 160 km/hr) its efficiency is also acceptable.

In the OFDM system, a precise, high data rate, and low complexity estimator is required for the channel estimation (270). Comparing the reliable symbol estimation discloses in the present invention with the comb-type pilot signal interpolation, the present invention uses fewer subcarrier for information transmission so it has a higher data rate. Furthermore, in the software simulation result, it shows the reliable symbol estimation also has better system performance; and for the calculation complexity, the singular value decomposition is utilized to estimate the entire channel frequency response to reduce the calculation complexity.

Although the present invention has been explained in relation to its preferred embodiment, it is to be understood that many other possible modifications and variations can be made without departing from the spirit and scope of the invention as hereinafter claimed.

What is claimed is:

1. An orthogonal frequency division multiplexing (OFDM) system for transmitting a modulated subcarrier signal from a transmitting end, transforming a frequency domain signal into a time domain signal via an inverse fast Fourier transform, inserting a guard interval between two time domain signals and transforming a time domain signal from parallel data into serial data to establish the modulated subcarrier signal, transmitting the modulated subcarrier signal from the transmitter via a wireless channel to a receiver, the receiver transforming serial data of the modulated subcarrier signal received into parallel data and removing the guard interval, utilizing a fast Fourier transform process to transform the time domain signal into a frequency domain signal to provide a received signal, using an equalizer to obtain an original received signal, and restore an original two digits information output via signal inverse correspondence, characterized in that:
   error detection is performed on the received signal obtained from the fast Fourier transform process to detect whether the received modulated subcarrier signal has any errors, and a channel estimator selectively executes to obtain a frequency response of the channel responsive to the error detection.

2. The orthogonal frequency division multiplexing system as claimed in claim 1, wherein the equalizer is an automatic gain control circuit.

3. The orthogonal frequency division multiplexing system as claimed in claim 1, wherein the error detection is a check sum of the modulated subcarrier signal.

4. The orthogonal frequency division multiplexing system as claimed in claim 1, wherein the channel estimator uses a least square estimation to estimate a channel frequency response, and uses a minimum mean square error (MMSE) to estimate a more precise channel frequency response.

5. The orthogonal frequency division multiplexing system as claimed in claim 1, wherein in the channel estimator a first symbol of the OFDM transmission signal is a training symbol.

6. A channel estimator for an orthogonal frequency division multiplexing system comprising:
   a signal error detection portion, for transforming two digits of information into serial data and inserting an error detection signal to provide a modulated subcarrier signal in the frequency domain, the error detection signal being indicative of errors in a received signal;
   an inverse fast Fourier transform portion, for transforming the frequency domain modulated subcarrier signal to a time domain signal via an inverse fast Fourier transform process;
   a transmitter, for transmitting the time domain signal on a wireless channel;
   a receiver, for receiving the time domain signal from the transmitter and performing a demodulation process;
   a fast Fourier transform portion, for transforming the time domain signal into a frequency domain signal to provide a frequency domain received signal;
   an error detection portion, for detecting whether the modulated subcarrier signal as received has any errors;
   a channel estimation portion, selectively executed responsive to the error detection portion for estimating a frequency response of the transmission channel.

7. The channel estimator for an orthogonal frequency division multiplexing system as claimed in claim 6, wherein two digits information data in the error detection signal are modulated by signal correspondence, and become serial data by serial-to-parallel transformation.

8. The channel estimator for an orthogonal frequency division multiplexing system as claimed in claim 6, wherein a guard interval is inserted between symbols in the time domain signals from the inverse fast Fourier transform to prevent inter-symbol interference of the received signal, and the time domain signal is transformed from parallel data into serial data.

9. The channel estimator for an orthogonal frequency division multiplexing system as claimed in claim 8, wherein the time domain signal received by the receiver is transformed from serial data into parallel data, and the guard interval between symbols of two time domain signals is removed.

10. The channel estimator for an orthogonal frequency division multiplexing system as claimed in claim 6, wherein the frequency response in the channel estimator is transformed into the original transmitted signal by an equalizer, and restore an original two digits of information for output.

11. The channel estimator for an orthogonal frequency division multiplexing system as claimed in claim 6, wherein the error detection is a check sum of the modulated subcarrier signal.

12. The channel estimator for an orthogonal frequency division multiplexing system as claimed in claim 6, wherein the channel estimator uses a least square (LS) estimation to estimate the channel frequency response, then uses a minimum mean square error (MMSE) to estimate a more precise channel frequency response.

13. The channel estimator for an orthogonal frequency division multiplexing system as claimed in claim 6, wherein in the channel estimator, the first symbol in the OFDM transmitted signal is a training symbol.

14. A channel estimation method for orthogonal frequency division multiplexing comprising:
   (a) transmitting a signal, a first symbol transmitted by a transmitter being a known signal, a receiver receiving and using the known signal to perform channel estimation and obtain storage channel parameters;
   (b) performing error detection, wherein while receiving a data symbol, the receiver uses an error detection signal sent from the transmitter to perform error detection of the data symbol to detect whether the data symbol has any errors;
   (c) selectively executing and inhibiting channel estimation responsive to the error detection, wherein if the first symbol is a reliable symbol, the reliable symbol is used to perform the channel estimation; and
   (d) updating the channel parameters by performing the channel estimation.

15. The method as claimed in claim 14, wherein the known signal is an all-pilot signal.

* * * * *